United States Patent
Sugiyama et al.

(10) Patent No.: US 7,429,925 B2
(45) Date of Patent: Sep. 30, 2008

(54) LABEL PRINTER HAVING AN RFID COMMUNICATION FUNCTION

(75) Inventors: Makoto Sugiyama, Mishima (JP); Kunihiko Aoba, Shizuoka (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 402 days.

(21) Appl. No.: 11/120,271

(22) Filed: May 2, 2005

(65) Prior Publication Data

US 2005/0248439 A1    Nov. 10, 2005

(30) Foreign Application Priority Data

May 10, 2004    (JP)    ............................. 2004-139658

(51) Int. Cl.
    *G08B 13/14*    (2006.01)
(52) U.S. Cl. .................. 340/572.1; 340/505; 340/10.1; 709/224; 714/712
(58) Field of Classification Search ............... 340/572.1
    See application file for complete search history.

(56) References Cited

U.S. PATENT DOCUMENTS

| | | | |
|---|---|---|---|
| 4,660,160 A | | 4/1987 | Tajima et al. |
| 5,418,353 A | * | 5/1995 | Katayama et al. ........... 235/380 |
| 5,616,905 A | | 4/1997 | Sugiyama |
| 5,703,348 A | | 12/1997 | Suzuki et al. |
| 5,727,230 A | * | 3/1998 | Fujioka ......................... 710/5 |
| 6,061,614 A | * | 5/2000 | Carrender et al. ......... 340/10.41 |
| 6,281,790 B1 | * | 8/2001 | Kimmel et al. .............. 340/506 |
| 6,409,401 B1 | * | 6/2002 | Petteruti et al. ................ 400/70 |
| 6,662,068 B1 | * | 12/2003 | Ghaffari ...................... 700/115 |
| 6,929,412 B1 | * | 8/2005 | Barrus et al. .............. 340/572.1 |
| 6,969,134 B2 | * | 11/2005 | Hohberger et al. ............. 347/2 |
| 7,066,667 B2 | * | 6/2006 | Chapman et al. ......... 340/572.1 |
| 7,190,270 B2 | * | 3/2007 | Brown et al. .............. 340/572.1 |
| 7,227,449 B2 | * | 6/2007 | Bonneau et al. .......... 340/10.41 |
| 7,227,468 B1 | * | 6/2007 | Florio ...................... 340/572.1 |
| 2007/0046424 A1 | * | 3/2007 | Davis et al. .............. 340/572.1 |
| 2007/0075834 A1 | * | 4/2007 | Armstrong et al. ......... 340/10.1 |

FOREIGN PATENT DOCUMENTS

| | | | |
|---|---|---|---|
| JP | 3-121878 A | | 5/1991 |
| JP | 11-186937 A | | 7/1999 |

* cited by examiner

*Primary Examiner*—George A Bugg
*Assistant Examiner*—Eric M. Blount
(74) *Attorney, Agent, or Firm*—Frishauf, Holtz, Goodman & Chick, P.C.

(57) ABSTRACT

An electronic apparatus having a RF tag communication function is provided which includes a RF tag reader/writer and a main controller for controlling the RF tag reader/writer. The RF tag reader/writer includes a radio communication section for executing radio communication with a RF tag and a controller for controlling the radio communication section. The main controller is capable of communication with the controller. A command which requests a reply is transmitted from the main controller to the RF tag reader/writer, and the controller is diagnosed based on the reply from the RF tag reader/writer.

4 Claims, 4 Drawing Sheets

LABEL PRINTER HAVING AN RFID COMMUNICATION FUNCTION

CROSS-REFERENCE TO RELATED APPLICATION

The present application is based on and claims the benefit of priority of Japanese Patent Application P2004-139658 filed on May 10, 2004, the entire contents of which are incorporated herein by reference.

BACKGROUND OF THE INVENTION

1. Field of the Invention

The present invention relates to an electronic apparatus having a RF tag communication function.

2. Description of Related Art

An electronic apparatus using RFID (Radio Frequency Identification) may be an electronic apparatus having a RF tag reader/writer which executes reading and writing on a RF tag by radio communication.

Such an electronic apparatus having a RF tag communication function controls a RF tag reader/writer by a main controller provided in the electronic apparatus. The RF tag reader/writer comprises a controller, a radio communication section and other parts and drives the radio communication in accordance with the main controller to execute reading and writing of data on the RF tag. Such electronic apparatuses having the RF tag communication function are described in Japanese Patent Laid-Open Publication No. Hei 11-186937 and Japanese Patent Laid-Open Publication No. Hei 3-121878.

The electronic apparatus may experience a communication error (a reading and writing error) for communication with the RF tag for various reasons. The reasons for the error could be an incorrect connection between the main controller and the RF tag reader/writer, a breakdown of the controller or the radio communication section of the RF tag reader/writer, the RF tag being incapable of radio communication with the RF tag reader/writer, and other reasons. To correct the communication error, identification of a reason for the error is necessary. To identify the reason, possible causes need to be checked one by one, and this process is troublesome.

Japanese Laid-Open Publication No. Hei 11-186937 discloses a self-diagnostic technology of the RF tag reader/writer; however, this self-diagnostic technology is not useful to identify a reason for error from various elements of the RF tag reader/writer, since the self-diagnostic technology checks only an operation of the RF tag reader/writer as a whole instead of an operation of each part. Japanese Laid-Open Publication No. Hei 3-121878 also discloses a self-diagnostic technology of a printer; however, there is no description or suggestion about a diagnosis of the communication error for the RF tag.

Accordingly, an object of the present invention is to provide an electronic apparatus which enables easy identification of the reason for the communication error for communication with the RF tag.

SUMMARY OF THE INVENTION

According to the present invention, an electronic apparatus having a RF tag communication function is provided which includes: (i) a radio communication apparatus including a radio communication section for executing radio communication with a RF tag and a controller for controlling the radio communication section, and (ii) a main controller for controlling the radio communication apparatus which is capable of communication with the controller. A command which requests a reply is transmitted from the main controller to the radio communication apparatus, and the controller is diagnosed based on the reply from the radio communication apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
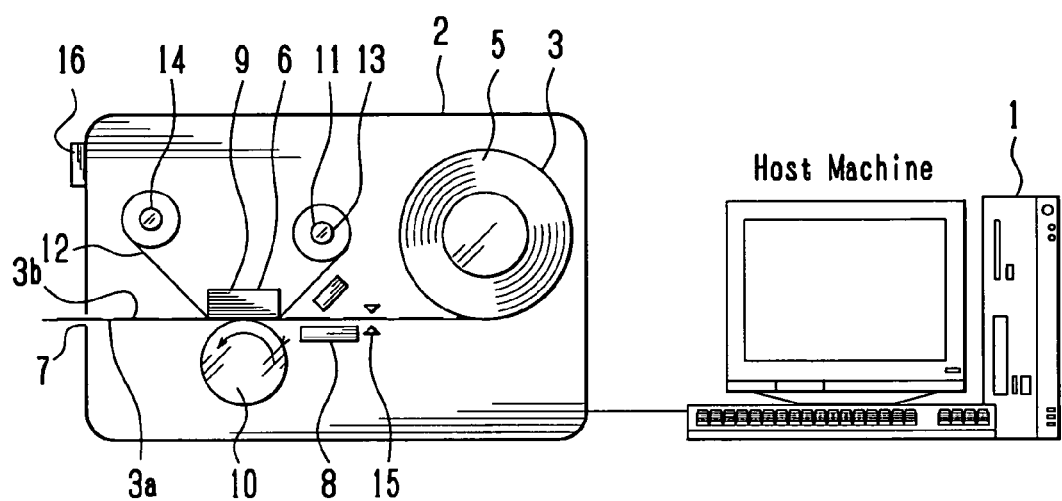
FIG. 1 is a schematic view showing a label printer of an embodiment of the present invention and a host machine.
Figure 2:
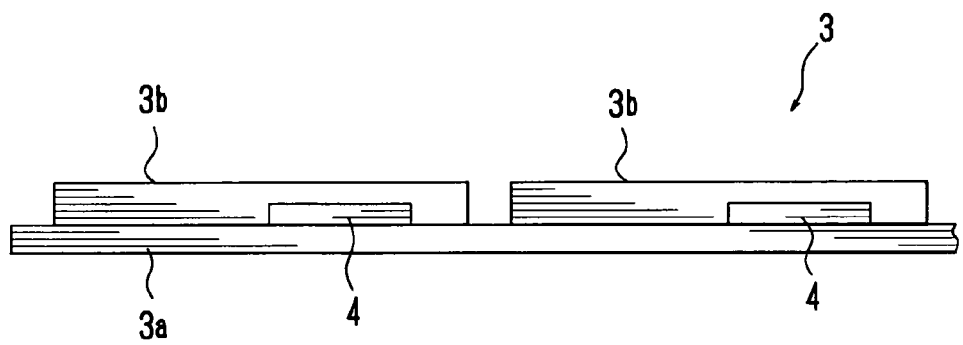
FIG. 2 is a side view in vertical section showing a label paper unrolled.

An embodiment of the present invention will be explained with reference to the drawings. The embodiment of the present invention is applied to the label printer 2, which is connected to the host machine 1 so as to be able to communicate data with the host machine 1.

The label printer 2 of the embodiment of the present invention uses the label paper 3 as a printing paper. The label paper 3 includes a plurality of labels 3b affixed on a lengthy base paper 3a. A RF tag 4 is embedded in each label 3b. The label paper 3 is rolled and held by a paper holder 5 to be freely unrolled.

The label printer 2 of the embodiment of the present invention has a structure wherein the label paper 3 pulled out from the paper holder 5 is transferred to a printing portion 6 so as to execute printing on the label paper 3, and a printed label 3b is issued from a label issuing port 7. In addition, prior to printing, reading and writing of predetermined information on the RF tag 4, which is embedded in the label 3b, is executed by radio communication by a RF tag reader/writer 8 as a radio communication apparatus at an upstream side of the printing portion 6. As explained above, the label printer 2 has a structure of using RFID (Radio Frequency Identification) wherein the RF tag reader/writer 8 executes reading and writing on the RF tag 4.

The printing portion 6 comprises a thermal head 9 and a platen 10 disposed opposite to the thermal head 9. At the printing portion 6, the thermal head 9 and the platen 10 pinch the label paper 3, and the platen 10 is rotatably driven by a drive motor M1 (shown in FIG. 3) so that the label paper 3 is pulled out from the paper holder 5 and is transferred. Then, the thermal head 9 prints a certain matter on the label 3b of the label paper 3 while the label paper 3 is transferred. The certain matter in this case is a matter based on printing data, which is transmitted from the host machine 1 to the label printer 2.

As a printing method by the thermal head 9, a thermal transfer printing system is applicable. Thus the label printer 2 of the embodiment of the present invention comprises an ink ribbon supplier 11 which guides and transfers an ink ribbon 12 between the label paper 3 and the thermal head 9. The ink ribbon supplier 11 has a structure in which the ink ribbon 12, which is held by a spindle 13, is transferred by being rolled up by a rolling shaft 14 which is rotatably driven by the drive motor M2 (shown in FIG. 3).

Also, sensors such as a label detecting sensor 15, which detects the label 3b, are provided in the label printer 2. Further, the label printer 2 includes an operation section 16 for receiving an operation instruction from an operator. The operation section 16 comprises a LCD (Liquid Crystal Display) 17 (shown in FIG. 3) and various kinds of operating keys 18 (shown in FIG. 3).

Figure 3:
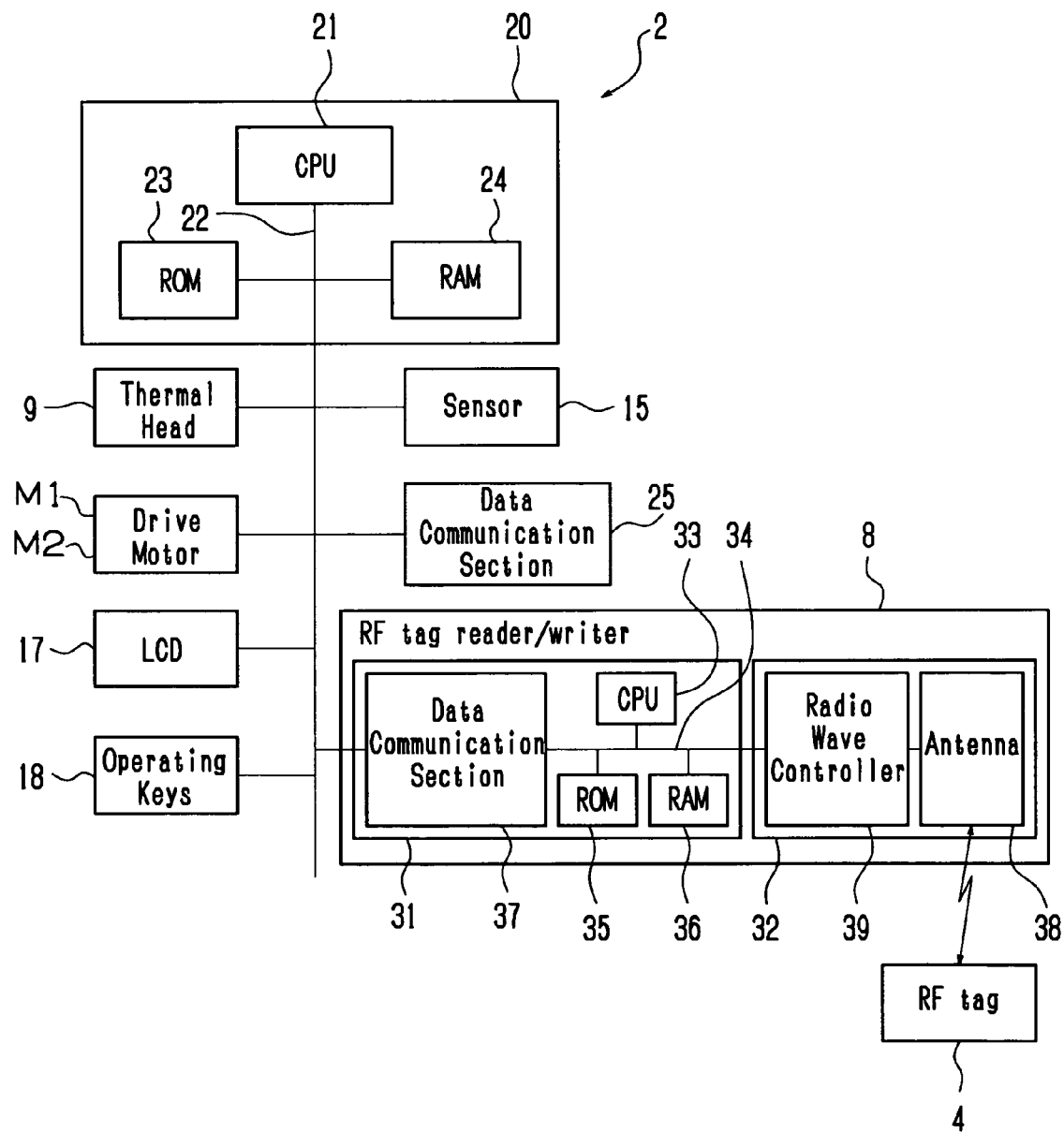
FIG. 3 is a block diagram showing an electric installation of the label printer.

FIG. 3 is a block diagram showing an electric installation of the label printer 2. The label printer 2 includes a main controller 20, which drives and controls each part in the label printer 2. The main controller 20 has a structure in which a CPU 21, which controls each part intensively, connects to a ROM 23 and a RAM 24 through a bus line 22. The ROM 23 is a memory which stores fixed data such as computer programs, in advance. RAM 24 is a memory which rewritably stores various data, and functions as a working area or a graphic memory, in addition to any other functions. The RF tag reader/writer 8, the thermal head 9, the drive motors M1, M2, the label detecting sensor 15, the LCD 17, the operating keys 18 and so on are connected to the main controller 20 through the bus line 22 so that each part is controllable by the main controller 20.

Also, data communication section 25 is connected to the main controller 20 through the bus line 22. The data communication section 25 executes transmitting and receiving of data with the host machine 1.

The RF tag reader/writer 8 connected to the main controller 20 will now be explained. The RF tag reader/writer 8 comprises a controller 31 and a radio communication section 32 which is controlled by the controller 31. The controller 31 includes a CPU 33 that is connected to a ROM 35, a RAM 36, and data communication section 37 through a bus line 34. The RAM 36 stores version information of the RF tag reader/writer 8 and various parameter information. The RAM 36 is backed up by a battery (not shown). The data communication section 37 is connected to the main controller 20 through the bus line 22. The radio communication section 32 comprises an antenna 38 and a radio wave controller 39, and transmits and receives electromagnetic waves via the antenna 38. The radio wave controller 39 is connected to the controller 31 through the bus line 34.

In this RF tag reader/writer 8, a radio wave is transmitted from the antenna 38 to the RF tag 4 to execute reading and writing of data on the RF tag by radio waves. As a reading/writing type by radio communication with respect to the RF tag reader/writer 8, an electrostatic coupling type, an electromagnetic coupling type, an electromagnetic induction type, a microwave type, or other types can be applicable. The RF tag 4 which is read and written to by the RF tag reader/writer contains an IC chip and an antenna (neither are shown), and is capable of transmitting and receiving data by radio communication with the RF tag reader/writer 8.

The controller 31 of the RF tag reader/writer 8 executes reading and writing in accordance with a reading run command or a writing run command, which are transmitted by the main controller 20. If reading is successful, read success data indicating the success of the reading is transmitted to the main controller 20, and if writing is successful, write success data indicating the success of the writing is transmitted to the main controller 20. On the other hand, if reading or writing fails, that is, if a communication error occurs, communication error data indicating the communication error is transmitted to the main controller 20. Hereinafter, the reading run command and the writing run command, will be referred to together as a reading/writing run command, and reading and writing will be referred to together as reading/writing.

The controller 31 returns a response data in accordance with various information demand commands transmitted by the main controller 20. As the various information demand commands, for instance, there are a version information demand command which demands transmission of the version information of the RF tag reader/writer, a parameter information demand command which demands transmission of various parameter information of the RF tag reader/writer and so on. The controller 31 transmits the version information of the RF tag reader/writer 8 to the main controller 20 in response to the version information demand command, and the controller 31 transmits the various parameter information to the main controller 20 in response to the parameter information demand command.

The host machine 1 will now be explained. The host machine 1 contains a computer which comprises a CPU, a ROM, and a RAM (none of them are shown) and executes transmitting and receiving of data with the label printer 2. This host machine 1 transmits printing data to the label printer 2 so as to execute printing on the label paper 2.

Various processes executed by the CPU 21 in accordance with computer programs stored in the ROM 23 will now be explained.

Firstly, a printing process will be briefly explained. If printing data from the host machine 1 is received, printing on a label 3b is executed by driving a drive motor M1, M2, and thermal head 9. Prior to the printing, reading and writing of data on the RF tag 4 embedded in the label 3b is executed. The label 3b is stopped to be positioned at a predetermined position when reading and writing on the RF tag 4 is executed. The predetermined position, to be specific, is an area of the RF tag reader/writer 8 where radio communication can occur. Control of positioning is possible by detecting a label with a label sensor 15. At that time, if data indicating a communication error (a reading/writing error) for the RF tag 4 is received from the controller 31, information of the error is displayed on the LCD 17, and is transmitted to the host machine 1 to notify an operator.

Figure 4:
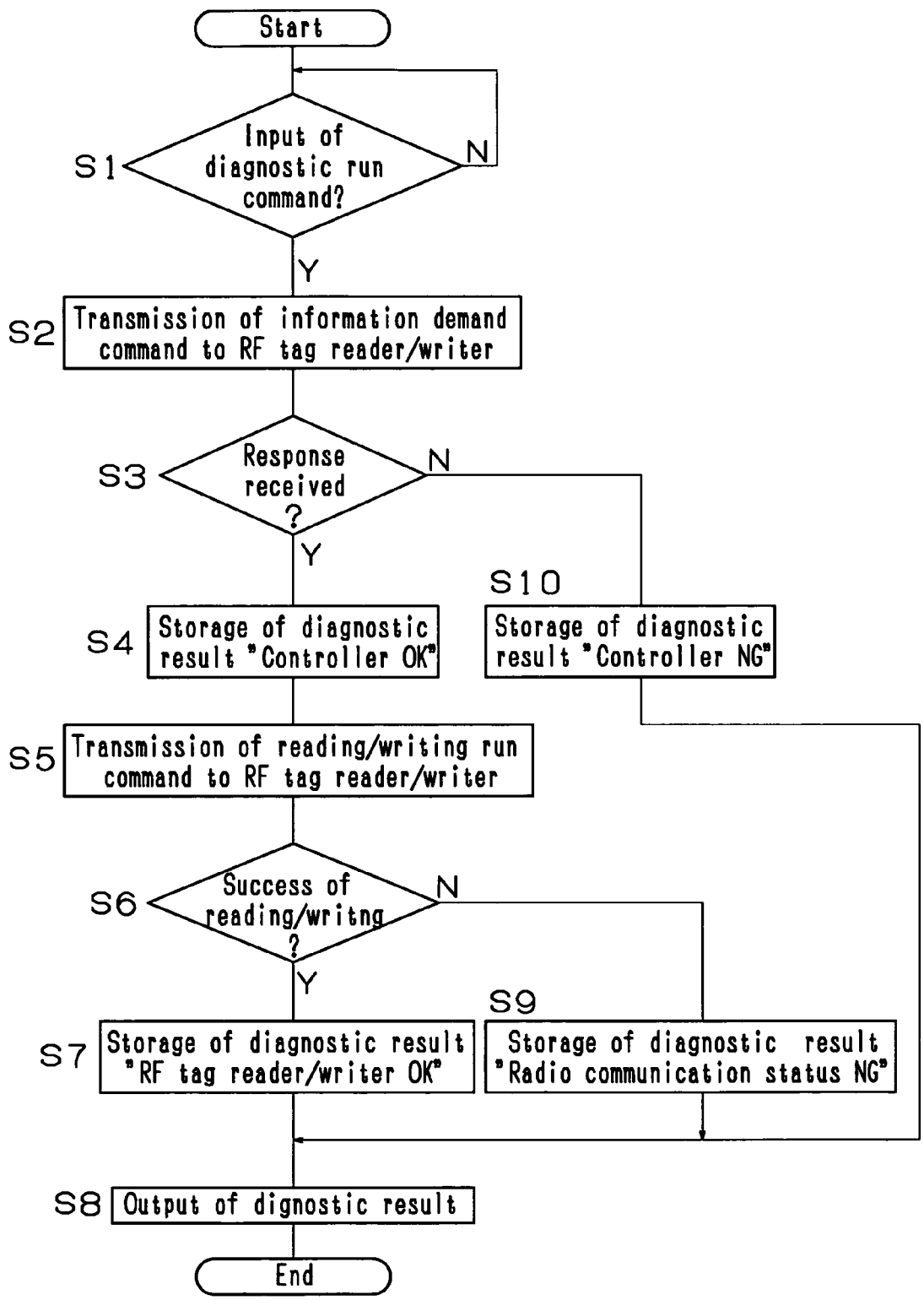
FIG. 4 is a flow chart showing a RF tag reader/writer diagnostic process initiated via an operation section.
Figure 5:
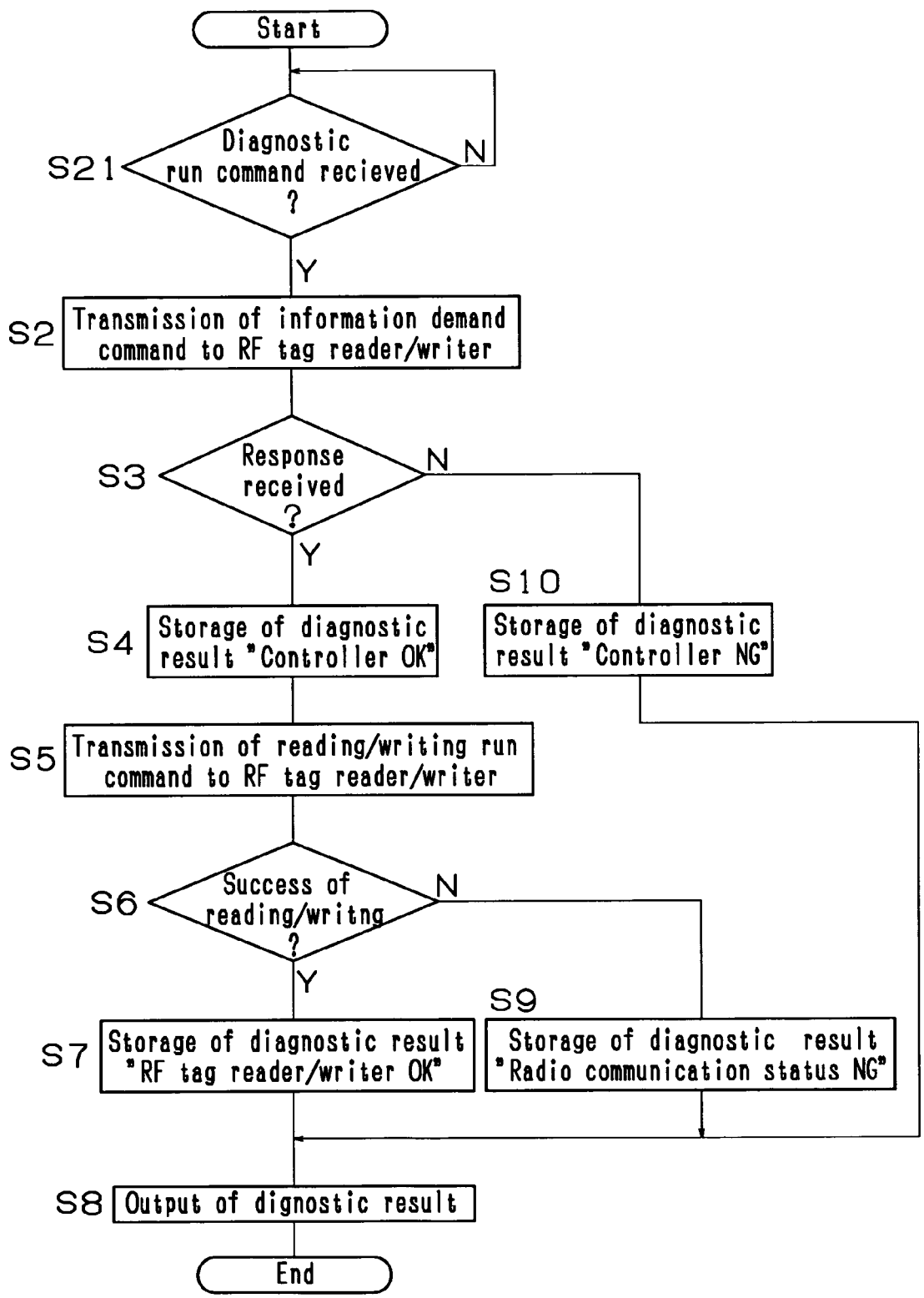
FIG. 5 is a flow chart showing the RF tag reader/writer diagnostic process initiated via an external apparatus.

Next, a RF tag reader/writer diagnostic process will be explained. FIG. 4 and FIG. 5 are flowcharts showing the RF tag reader/writer diagnostic process. The diagnostic process can be executed in response to an instruction from the operator via the operation section 16, or an instruction from the host machine 1 as an external apparatus. The diagnostic process in response to the instruction from the operation section 16 will now be explained.

As shown in FIG. 4, the diagnostic process stands by until a diagnostic run command is input from the operation section 16 (N of step S1). In detail, the diagnostic run command is input when "RF tag reader/writer diagnosis" is selected by the operator, using the operation keys 18, from a self-diagnostic menu displayed on the LCD 17.

When the diagnostic run command is input (Y of step S1), an operation status of the controller 31 is diagnosed as a first diagnosis. To be specific, the information demand commands such as the version information demand command or the parameter information demand command are transmitted to the controller 31 of the RF tag reader/writer 8 (step S2), and then whether a response is received or not is judged (step S3). In this case, if the controller 31 including a connection with the main controller 20 is normal, the controller 31 receives the information demand command and returns the response data. If there is no response, something abnormal has occurred in the controller 31 including the connection with the main controller 21. If there is no response for a predetermined time when the information demand command is transmitted, for example, it can be judged that there is no response. Thus when there is a response, it is diagnosed that "the controller 31 is normal" and the diagnosis is stored in RAM 24 (step S4). Then a second diagnostic process is executed, which will be explained in step S5 and later steps. If there is no response (N of step S3), it is diagnosed that "the controller 31 is abnormal" and the diagnosis is stored in RAM 24 (step S10). Then, a result of the diagnosis is output at step S8. To be specific, the diagnosis of "the controller 31 is abnormal" is displayed on the LCD 17. Here, the first diagnostic process is thus executed by the steps S2, S3, S4, and S10.

The second diagnostic process executed by step S5 and later steps is a process for diagnosing radio communication status of the RF tag reader/writer 8 with respect to the RF tag 4. More specifically, a reading/writing run command is transmitted to the controller 31 of the RF tag reader/writer 8 (step S5) and whether reading/writing on the RF tag 4 is successful or not is judged. In this case, if the radio communication section 32 and the RF tag 4 are normal, reading/writing on the radio communication section 32 or the RF tag 4 should be successful and the controller 31 transmits success read data or success write data indicating the successful reading or writing to the main controller 20. If reading/writing fails, the controller 31 transmits communication error data indicating a communication error to the main controller 20.

Thus, when reading/writing is judged to be successful by receiving success read data or success write data (Y of step S6), it is diagnosed that "radio communication status with respect to the RF tag 4 is normal". In this case, since the controller 31 has already been judged to be normal at step S4, it is diagnosed that "the RF tag reader/writer 8 as a whole is normal" and the diagnosis is stored in RAM 24 (step S7). Then the diagnosis, "the RF tag reader/writer 8 as a whole is normal" is displayed on the LCD 17 at step S8.

On the other hand, when communication error data is received and reading/writing on the RF tag is judged to have failed, it is diagnosed that "radio communication status of the RF tag reader/writer 8 with respect to the RF tag 4 is abnormal", and the diagnosis is stored in RAM 24. Then the diagnostic result is output at step S8. At this time, the diagnoses of "the controller 31 is normal" and "radio communication status of the RF tag reader/writer with respect to the RF tag 4 is abnormal" are output and displayed on the LCD 17. The second diagnostic process is thus executed by the steps S5, S6, S7, and S9.

Next, the diagnostic process in response to the instruction from the host machine 1 as the external apparatus will now be explained. The same diagnostic processes with the diagnostic processes in response to the instruction from the operation section 16 will be omitted.

As shown in FIG. 5, the diagnostic process stands by until a diagnostic run command from the host machine 1 is received by the data communication section 25 (N of step S21). When the diagnostic run command is received (Y of step S21), the RF tag reader/writer 8 is diagnosed by processes of S2 to S7, S9, and S10 as is the case with the diagnostic processes, initiated by the instruction from the operation section 16 as explained above. Then, a diagnostic result is output at step S8. To be specific, in this case, the diagnostic result is transmitted to the host machine 1.

As explained above, as the first diagnostic process with respect to the RF tag reader/writer 8 in the embodiment of the present invention, a data transmission from the main controller 20 to the RF tag reader/writer 8 is executed and the status of the controller 31 is diagnosed based on a response so that the diagnostic results such as "the controller 31 is normal" or "the controller 31 is abnormal" can be obtained, and whether the controller 31 is normal or abnormal can be assessed.

In addition, the radio communication run command with respect to the RF tag 4 is transmitted from the main controller 20 to the controller 31, and the radio communication status with respect to the RF tag 4 is diagnosed based on a response so that the diagnostic results such as "the radio communication status of the RF tag reader/writer 8 with respect to the RF tag 4 is normal" or "the radio communication status of the RF tag reader/writer 8 with respect to the RF tag 4 is abnormal" can be obtained, and whether the radio communication status with respect to the RF tag 4 is normal or abnormal can be assessed.

Further, when it is judged that the RF tag reader/writer 8 as a whole is normal, the RF tag reader/writer 8 as a whole can be assessed to be normal.

Thus, when information is received indicating a communication error for the RF tag 4, for instance, the operator executes the diagnostic process of the RF tag reader/writer 8 during a usage of the label printer 2. Then, when the diagnostic result is "the controller 31 is abnormal", the reason can be either that the controller 31 itself is abnormal or that an installation of the RF tag reader/writer 8 is incorrect such that the controller 31 is not connected to the main controller 20. In this case, the operator first checks a connection of the RF tag reader/writer 8, and if it is disconnected, he/she connects it correctly. If the RF tag reader/writer 8 is connected correctly, it can be assessed that the controller 31 itself may be abnormal.

When the diagnostic result is "the controller 31 is normal" and "the radio communication status of the RF tag reader/writer with respect to the RF tag 4 is abnormal", the reason of the communication error can be either that the radio communication section 32 is abnormal or the RF tag 4 being abnormal. Reasons for the error for the RF tag 4 may be that the RF tag 4 is not located in a predetermined location, or that the RF tag 4 is not an appropriate RF tag which is capable of being read and written to by the RF tag reader/writer 8. The operator has only to check the RF tag 4 first. If the RF tag 4, or positioning thereof, is abnormal, the operator puts the RF tag in the predetermined location, or changes the RF tag 4 to an appropriate one. If the RF tag 4 is normal, it can be assessed that the radio communication section 32 is abnormal. As can be seen, according to the label printer 2 of the embodiment of the present invention, identification of reasons for the communication error for the RF tag 4 is straightforward.

In addition, according to the embodiment of the present invention, an operation section 16 is provided so that the diagnostic run command may be input in accordance with the operation instruction by the operator. Thus the label printer 2 by itself can start the diagnostic process in response to the input of the diagnostic run command.

Still further, according to the embodiment of the present invention, the data communication section 25 which executes data communication with the host machine 1 is provided. Thus the diagnostic process can be started upon a receipt of the diagnostic run command from the host machine 1, so that it is unnecessary for the operator to go to the label printer 2.

The embodiment of the present invention is described in conjunction with a specific example of the RF tag reader/writer 8 as the radio communication apparatus, but the present invention is not limited to the example. The radio communication apparatus can be a different RF tag reader/writer.

Further, the embodiment of the present invention is described in conjunction with a specific example of the label printer 2 as the electronic apparatus having a RF tag communication function, but the present invention is not limited to the example. The electronic apparatus having a RF tag communication function can be the RF tag reader/writer 8 or an electronic apparatus having a RF tag reader which is capable of radio communication with the RF tag 4. For example, the electronic apparatus having a RF tag communication function may be a POS terminal or an electronic scale having the RF tag reader/writer 8 or a RF tag reader.

Obviously, numerous modifications and variations of the present invention are possible in light of the above description of the present invention. It is therefore to be understood that within the scope of the appended claims, the invention may be practiced otherwise than as specifically described herein.

What is claimed is:

1. An electronic apparatus, comprising:
a radio communication apparatus including a radio communication section for executing radio communication with a RF tag, and a controller for controlling the radio communication section;
a main controller which is capable of communication with the controller and which controls the radio communication apparatus;
first diagnostic means for executing a first diagnostic process in which the main controller transmits a command to the controller of the radio communication apparatus requesting a reply from the controller of the radio communication apparatus, and then determining whether a radio communication status between the main controller and the radio communication apparatus is abnormal depending on whether the main controller receives the reply from the controller of the radio communication apparatus; and
second diagnostic means for executing a second diagnostic process in which the main controller transmits a radio communication run command to the controller of the radio communication apparatus for communicating with the RF tag, and then determines whether a radio communication status between the radio communication apparatus and the RF tag is abnormal depending on whether the main controller receives a reply from the RF tag.

2. The electronic apparatus according to claim 1, further comprising an operation section for inputting a diagnostic run command in accordance with an operation by an operator;
wherein the first diagnostic means and the second diagnostic means operate in response to the diagnostic run command.

3. The electronic apparatus according to claim 1, further comprising a data communication section for executing data communication with an external apparatus,
wherein the first diagnostic means and the second diagnostic means operate in response to a diagnostic run command from the external apparatus.

4. The electronic apparatus according to claim 1, further comprising a display which displays diagnostic results obtained by the first and second diagnostic means.

* * * * *